United States Patent [19]

Johansen

[11] Patent Number: 4,526,248
[45] Date of Patent: Jul. 2, 1985

[54] MOTORIZED CART FOR BERRY-PICKING, WEEDING AND THE LIKE

[76] Inventor: Kjell E. Johansen, Rosenkrantzgt. 11, Drammen, N-3000, Norway

[21] Appl. No.: 475,536

[22] Filed: Mar. 15, 1983

[51] Int. Cl.³ ............................................. B62M 67/00
[52] U.S. Cl. .................................. 180/89.1; 280/32.5
[58] Field of Search ............... 280/32.5, 32.7; 56/323, 56/27.5, 28; 172/431; 180/89.1

[56] References Cited

U.S. PATENT DOCUMENTS

| | | | |
|---|---|---|---|
| 1,370,347 | 3/1921 | Nelson | 280/32.5 |
| 2,369,258 | 2/1945 | Shebat | 244/234 X |
| 2,823,393 | 2/1958 | Baldine | 244/122 R |
| 2,825,273 | 3/1958 | Faucheux | 280/32.5 X |
| 3,037,570 | 6/1962 | Olson | 280/32.5 X |
| 3,976,155 | 8/1976 | Esch | 280/32.5 |
| 4,395,186 | 7/1983 | Whyte | 280/32.5 X |

*Primary Examiner*—John A. Pekar
*Attorney, Agent, or Firm*—Ladas & Parry

[57] ABSTRACT

A motorized cart for berry-picking, weeding and the like. The cart consists of a wheel frame on which a pad is provided which is adjustable to the contours of the human body. Also attached to the frame is a head support means which provides an unobstructed downward view for the berry-picker. A support rack for berry baskets and crates is secured to the sides of the cart, and the cart can also be provided with a roof so that picking and weeding can be performed in inclement weather.

2 Claims, 1 Drawing Figure

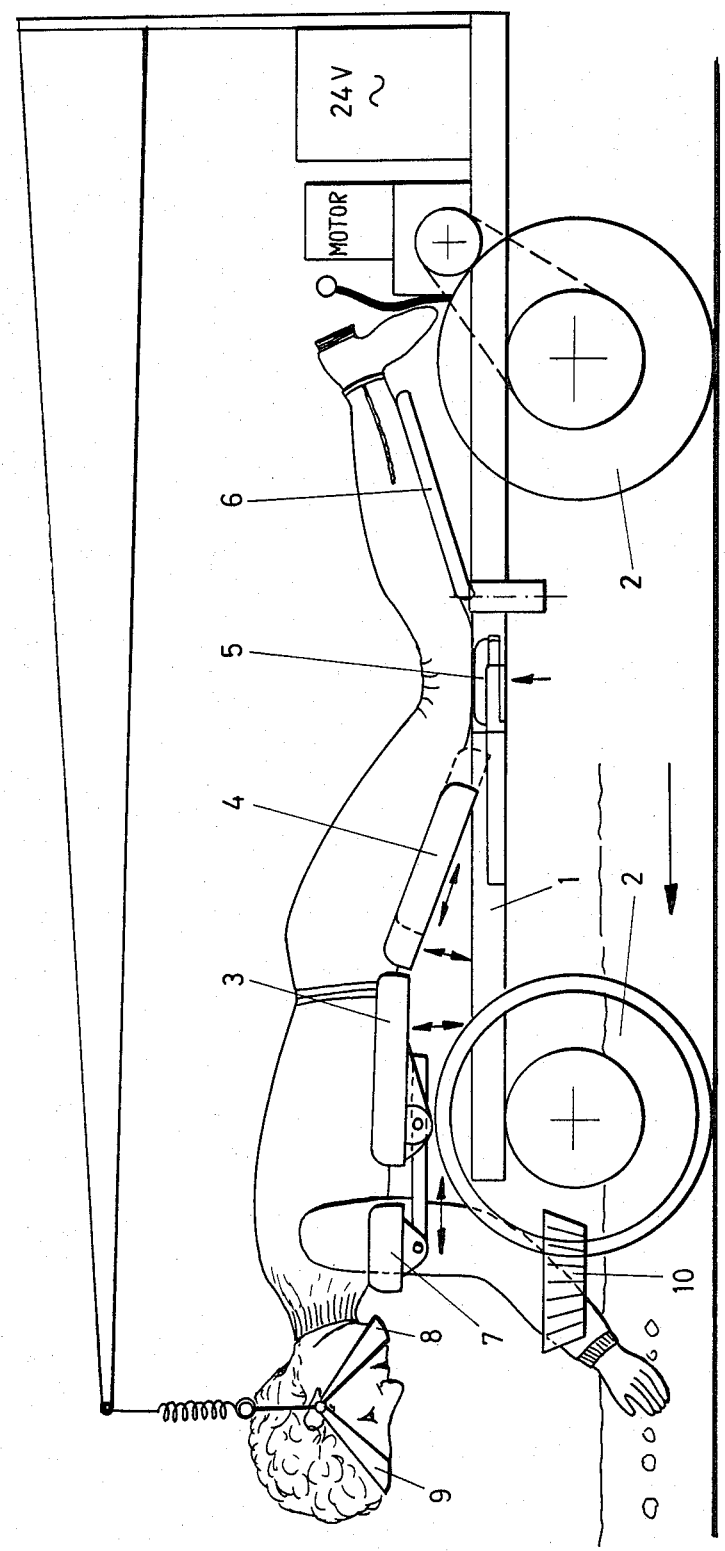

MOTORIZED CART FOR BERRY-PICKING, WEEDING AND THE LIKE

The present invention relates to a motorized cart for berry-picking, weeding and the like, wherein a pad that is adjustable to the body of a person lying prone upon it is provided on a wheeled frame.

Berry-picking, especially strawberry picking, and weeding are tasks which often cause muscular strain, sometimes leading to temporary or permanent incapacity, owing to the strains, particularly on the shoulder and neck muscles and the back, which the work entails.

A motorized chair for berry-picking and weeding is previously known from Norwegian Pat. No. 79.484, but this chair would be of very little use in helping to avoid strains on the shoulder and neck muscles and the back.

The object of the present invention is to provide a device which prevents strain injuries when a person is picking berries or weeding, and which at the same time makes the worker's job easier and increases his capacity.

This object is obtained in accordance with the invention by means of a motorized cart of the type defined above, which is characterized in that the pad is subdivided into separate, adjustable cushions for the user's chest, stomach, hips/thighs, knees and calves, and that a head support is provided consisting of a forwardly projecting member with a forehead and/or chin support. Supported by the cart, the body of the person picking berries is in a much better position for performing the task. In addition, since the pad consists of several parts which all are adjustable, it will also be possible for persons with various types of physical disabilities to participate in this type of work.

In a further development of the invention, the cart is provided with a head support in the form of an overhead support secured to the frame, with a resilient forehead and chin strap suspended from the overhead support. With this head support, the shoulder and neck muscles will not be subjected to much strain, and the picker will thus be able to pick berries for several hours without suffering tiredness in his back, arms or neck. Because the user lies prone on the cart, it will be easy for him to find the berries, as his head will be directly above the berries.

At the sides of the cart, a support rack for berry baskets can be provided. This cuts down the distance the berries have to be transported from plant to basket, and makes any extra handling unnecessary. The cart can carry several crates, so that no time need be lost when the baskets are full and ready to be transferred into crates.

The invention will be described in greater detail in the following with reference to the accompanying drawing, which is a sketch of a motorized berry-picking cart.

The drawing shows a frame 1 with wheels 2. On top of the frame 1 is a pad 3,4,5,6,7, which in the present example consists of several adjustable cushions so that the pad can be adjusted to the body of the user. The user lies prone on the pad with his head facing forward. In order not to put too much strain on the neck muscles, the head can be supported by a forwardly-projecting support means for the forehead and chin, for example with an open space in between so that the user's view is not obstructed. This form of support is not illustrated in the drawing.

The head support may also take the form shown in the drawing, i.e. an overhead support attached to the frame with a resilient support means in the form of a chin or forehead strap 8,9 suspended from the overhead support. At the side of the cart, a support rack for berry baskets, indicated by reference numeral 10 on the drawing, may be provided.

The wheel frame can be articulated in the center, and steered in front, and the cart can be provided with an electric motor, the gas and brakes being operated with a foot pedal, for instance.

Having described my invention, I claim:

1. A motorized cart for berry-picking, weeding and the like, wherein a pad adjustable to the contours of the human body in a lying position on said cart is provided on a wheel frame, comprising the pad being subdivided into separate, adjustable cushions for a user's chest, stomach, hips/thighs, knees and calves as well as a head support in the form of a forwardly-projecting member with a forehead and/or chin support, said pad being solely to provide correct anatomic support for the user in the lying position and being independent of any drive means for the cart.

2. A motorized cart according to claim 1, wherein the head support is an overhead support attached to the frame, with a resilient forehead and chin strap suspended therefrom.

* * * * *